(12) United States Patent
Sikri et al.

(10) Patent No.: US 8,503,591 B2
(45) Date of Patent: Aug. 6, 2013

(54) ENHANCED GERAN RECEIVER USING CHANNEL INPUT BEAMFORMING

(75) Inventors: Divaydeep Sikri, Woking (GB); Farrokh Abrishamkar, San Diego, CA (US); Michael McCloud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 551 days.

(21) Appl. No.: 12/193,995

(22) Filed: Aug. 19, 2008

(65) Prior Publication Data

US 2010/0046682 A1  Feb. 25, 2010

(51) Int. Cl.
*H04B 1/10* (2006.01)

(52) U.S. Cl.
USPC ........... 375/350; 375/144; 375/148; 375/346; 375/341; 375/262; 375/260; 375/265

(58) Field of Classification Search
USPC ................. 375/284, 285, 350, 346, 226, 260, 375/348, 144, 148, 341, 262, 265
See application file for complete search history.

(56) References Cited

U.S. PATENT DOCUMENTS

| | | | |
|---|---|---|---|
| 5,267,249 A | 11/1993 | Dong | |
| 6,480,558 B1 | 11/2002 | Ottosson et al. | |
| 6,587,522 B1 | 7/2003 | Wheeler et al. | |
| 6,590,881 B1 | 7/2003 | Wallace et al. | |
| 6,628,707 B2 | 9/2003 | Rafie et al. | |
| 6,765,894 B1 | 7/2004 | Hayashi | |
| 6,907,092 B1 | 6/2005 | Yakhnich et al. | |
| 6,931,030 B1 | 8/2005 | Dogan | |
| 6,985,516 B1 | 1/2006 | Easton et al. | |
| 7,013,147 B1 | 3/2006 | Kuwahara et al. | |
| 7,107,031 B2 | 9/2006 | Kristensson et al. | |
| 7,187,736 B2 | 3/2007 | Buckley et al. | |
| 7,200,172 B2 | 4/2007 | Pukkila et al. | |

(Continued)

FOREIGN PATENT DOCUMENTS

| | | |
|---|---|---|
| CN | 1207835 A | 2/1999 |
| CN | 1906862 A | 1/2007 |

(Continued)

OTHER PUBLICATIONS

3GPP Draft; 25814-150, 3rd Generation Partnership Project (3GPP), Mobile Competence Centre ; 650, Route Des Lucioles ; F-06921 Sophia-Antipolis Cedex ; France, vol. RAN WG1, No. Shanghai, China; 20060526, May 26, 2006, XP050102001, pp. 1-125.

(Continued)

*Primary Examiner* — Daniel Washburn
*Assistant Examiner* — Rahel Guarino
(74) *Attorney, Agent, or Firm* — Kenneth K. Vu; Brian Lambert

(57) ABSTRACT

A method for suppressing interference in a wireless communication is provided. The method comprises receiving a burst of symbols, generating a plurality of timing hypotheses for the burst of symbols, and calculating, for each timing hypothesis, a plurality of weights for an interference suppression filter based upon a subset of the burst of symbols. The method further comprises, for each timing hypothesis, filtering the subset of the burst of symbols using the interference suppression filter with the corresponding plurality of weights, and selecting one of the plurality of timing hypotheses corresponding to a selection criteria. The method further comprises equalizing and decoding the filtered burst of symbols based upon the selected one of the plurality of timing hypotheses.

36 Claims, 8 Drawing Sheets

(56) References Cited

U.S. PATENT DOCUMENTS

| | | |
|---|---|---|
| 7,295,636 B2 | 11/2007 | Onggosanusi et al. |
| 7,298,806 B1 | 11/2007 | Varma et al. |
| 7,308,056 B2 | 12/2007 | Pukkila et al. |
| 7,620,662 B2 | 11/2009 | Kassai et al. |
| 2002/0132625 A1 | 9/2002 | Ogino et al. |
| 2002/0181557 A1 | 12/2002 | Fujii |
| 2003/0112370 A1 | 6/2003 | Long et al. |
| 2004/0001563 A1 | 1/2004 | Scarpa |
| 2004/0017311 A1 | 1/2004 | Thomas et al. |
| 2004/0043746 A1 | 3/2004 | Hiramatsu |
| 2004/0081248 A1 | 4/2004 | Parolari |
| 2004/0116122 A1 | 6/2004 | Zeira et al. |
| 2004/0170234 A1 | 9/2004 | Pukkila et al. |
| 2004/0192215 A1 | 9/2004 | Onggosanusi et al. |
| 2004/0203913 A1 | 10/2004 | Ogino et al. |
| 2004/0223538 A1 | 11/2004 | Zeira |
| 2005/0084045 A1 | 4/2005 | Stewart et al. |
| 2005/0111408 A1 | 5/2005 | Skillermark et al. |
| 2005/0147024 A1 | 7/2005 | Jung et al. |
| 2005/0152485 A1 | 7/2005 | Pukkila et al. |
| 2005/0153695 A1 | 7/2005 | Cho |
| 2005/0232174 A1 | 10/2005 | Onggosanusi et al. |
| 2005/0265465 A1 | 12/2005 | Hosur et al. |
| 2005/0277429 A1 | 12/2005 | Laroia et al. |
| 2006/0109938 A1 | 5/2006 | Challa et al. |
| 2006/0126765 A1 | 6/2006 | Shin et al. |
| 2006/0146953 A1 | 7/2006 | Raghothaman et al. |
| 2006/0146969 A1 | 7/2006 | Zhang et al. |
| 2006/0203943 A1 | 9/2006 | Scheim et al. |
| 2006/0209982 A1 | 9/2006 | De Gaudenzi et al. |
| 2006/0227853 A1 | 10/2006 | Liang et al. |
| 2006/0234715 A1 | 10/2006 | Cho et al. |
| 2007/0058709 A1 | 3/2007 | Chen et al. |
| 2007/0063897 A1 | 3/2007 | Matsuda |
| 2007/0121764 A1 | 5/2007 | Chen et al. |
| 2007/0127608 A1 | 6/2007 | Scheim et al. |
| 2007/0183483 A1 | 8/2007 | Narayan et al. |
| 2007/0201548 A1 | 8/2007 | Badri-Hoeher et al. |
| 2007/0273698 A1 | 11/2007 | Du et al. |
| 2008/0019467 A1 | 1/2008 | He |
| 2008/0031368 A1 | 2/2008 | Lindoff et al. |
| 2008/0125070 A1 | 5/2008 | Grieco et al. |
| 2008/0212462 A1 | 9/2008 | Ahn et al. |
| 2008/0227456 A1 | 9/2008 | Huang et al. |
| 2008/0232439 A1 | 9/2008 | Chen |
| 2008/0298521 A1 | 12/2008 | Wu |
| 2008/0298524 A1 | 12/2008 | Koorapaty et al. |
| 2009/0052591 A1 | 2/2009 | Chen |
| 2009/0058728 A1 | 3/2009 | Mostafa et al. |
| 2009/0092178 A1 | 4/2009 | Sayana et al. |
| 2009/0207944 A1 | 8/2009 | Furman et al. |
| 2009/0213971 A1 | 8/2009 | Park et al. |
| 2010/0027702 A1 | 2/2010 | Vijayan et al. |
| 2010/0029213 A1 | 2/2010 | Wang |
| 2010/0029262 A1 | 2/2010 | Wang et al. |
| 2010/0040035 A1 | 2/2010 | Shapiro et al. |
| 2010/0046595 A1 | 2/2010 | Sikri et al. |
| 2010/0046660 A1* | 2/2010 | Sikri et al. ............ 375/285 |
| 2010/0202544 A1 | 8/2010 | Osseirar et al. |
| 2010/0248666 A1 | 9/2010 | Hui et al. |
| 2010/0278227 A1 | 11/2010 | Sikri et al. |
| 2010/0296556 A1 | 11/2010 | Rave et al. |
| 2010/0310026 A1 | 12/2010 | Sikri et al. |
| 2011/0051859 A1 | 3/2011 | Canpolat et al. |
| 2011/0051864 A1 | 3/2011 | Chalia et al. |
| 2011/0305303 A1* | 12/2011 | Sikri et al. ............ 375/341 |

FOREIGN PATENT DOCUMENTS

| | | |
|---|---|---|
| EP | 0396403 A1 | 11/1990 |
| EP | 0969608 A2 | 1/2000 |
| EP | 1247611 A1 | 9/2003 |
| EP | 1404047 A2 | 3/2004 |
| EP | 1411693 A2 | 4/2004 |
| EP | 1569399 A1 | 8/2005 |
| EP | 1681775 A2 | 7/2006 |
| EP | 1699194 A1 | 9/2006 |
| EP | 1699195 A1 | 9/2006 |
| EP | 1928138 A2 | 6/2008 |
| JP | 2000059290 A | 2/2000 |
| JP | 2000261397 A | 9/2000 |
| JP | 2001166026 A | 6/2001 |
| JP | 3210915 B2 | 9/2001 |
| JP | 2001257626 A | 9/2001 |
| JP | 2001267987 A | 9/2001 |
| JP | 2002507342 A | 3/2002 |
| JP | 2002539711 A | 11/2002 |
| JP | 2003051762 A | 2/2003 |
| JP | 2004048307 A | 2/2004 |
| JP | 2004112094 A | 4/2004 |
| JP | 2004511189 A | 4/2004 |
| JP | 2005065197 A | 3/2005 |
| JP | 2005510940 A | 4/2005 |
| JP | 2006191587 A | 7/2006 |
| JP | 2009515219 A | 4/2009 |
| JP | 2009545219 A | 12/2009 |
| KR | 20010085143 A | 9/2001 |
| KR | 1020050097552 A | 10/2005 |
| RU | 2280329 C1 | 7/2006 |
| RU | 2301493 | 6/2007 |
| WO | 9857509 A2 | 12/1998 |
| WO | WO0055992 A1 | 9/2000 |
| WO | WO0232003 A1 | 4/2002 |
| WO | WO02067444 A1 | 8/2002 |
| WO | WO03047124 A1 | 6/2003 |
| WO | WO2004066666 | 8/2004 |
| WO | 2005053177 A1 | 6/2005 |
| WO | 2007000620 A1 | 1/2007 |
| WO | WO2007029958 A1 | 3/2007 |
| WO | WO2007060093 A1 | 5/2007 |
| WO | WO2007060229 A1 | 5/2007 |
| WO | WO2008012265 A1 | 1/2008 |
| WO | WO2009108586 | 9/2009 |
| WO | WO2009140338 A2 | 11/2009 |

OTHER PUBLICATIONS

Huaiyu D Ai et al; "Asymptotic spectral efficiency of multi cell mimo systems with frequency-flat fading" IEEE Transactions on Signal Processing, IEEE Service Center, New York, NY, US, vol. 51, No. 11, Nov. 1, 2003, pp. 2976-2988, XP011102811.

International Search Report—PCT/US2009/052515—International Search Authority, European Patent Office, Nov. 18, 2009.

International Search Report—PCT/US2009/052596—International Search Authority, European Patent Office, Nov. 19, 2009.

International Search Report & Written Opinion—PCT/US2009/053961, International Search Authority—European Patent Office—Nov. 6, 2009.

International Search Report and Written Opinion—PCT/US2009/034794, International Search Authority—European Patent Office—Oct. 20, 2009.

Pais A V et al: "Indoor DS-CDMA system deployment and performance with successive interference cancellation" Electronics Letters, IEE Stevenage, GB, vol. 40, No. 19, Sep. 16, 2004, pp. 1200-1201, XP006022654.

RITT: "Performance of IDMA-based inter-cell interference cancellation" 3GPP Draft; R1-060895, 3rd Generation Partnership Project (3GPP), Mobile Competence Centre ; 650, Route Des Lucioles ; F-06921 Sophia-Antipolis Cedex ; France, vol. RAN WG1, No. Athens, Greece; 20060320, Mar. 20, 2006, XP050101801, pp. 1-5.

European Search Report—EP11152777—Search Authority—Munich—Apr. 14, 2011.

International Search Report—PCT/US2010/032858—International Search Authority, European Patent Office, Dec. 15, 2010.

International Search Report and Written Opinion—PCT/US2009/053962, International Search Authority—European Patent Office—Nov. 19, 2009.

Meyr, H. et al., "Chapter 5; Synthesis of Synchronization Algorithms" and "Chapter 8: Frequency Estimation," Jan. 1, 1998, Digital Communication Receivers; Synchronization, Channel Estimation, and Signal Processing; John Wiley and Sons, Inc.; New York, pp. 271-323,445, XP002547568.

European Search Report—EP11194624—Search Authority—Munich—Jan. 18, 2012.
Chunguang, W., et al., "Enhanced OTDOA Technology in 3G Location Service", Shanghai Research Institute of China Telecom, Shanghai 200122, China, Aug. 31, 2005.
Natali F.D., "AFC Tracking Algorithms" IEEE Transactions on Communications, IEEE Service Center, Piscataway, NJ, US, vol. COM-32, No. 8, Aug. 1, 1984, pp. 935-947, XP000758571 ISSN: 0090-6778 abstract p. 941, section C.

Olivier J.C., et al., "Single antenna interference cancellation for synchronised GSM networks using a widely linear receiver" (Feb. 1, 2007) pp. 131-136, XP006028092.
Taiwan Search Report—TW098127762—TIPO—Jan. 4, 2013.
The study of Interference Cancellation based on Multi-User Detection, Mar. 27, 2008.

* cited by examiner

US 8,503,591 B2

ENHANCED GERAN RECEIVER USING CHANNEL INPUT BEAMFORMING

REFERENCE TO CO-PENDING APPLICATIONS FOR PATENT

The present application for patent is related to co-pending U.S. patent application Ser. No. 12/038,724, filed Feb. 27, 2008, and entitled "COHERENT SINGLE ANTENNA INTERFERENCE CANCELLATION FOR GSM/GPRS/EDGE," assigned to the assignee hereof, and expressly incorporated by reference herein.

BACKGROUND

1. Field

The present invention relates to wireless communication and, in particular, relates to coherent single antenna interference cancellation.

2. Background

In many communication systems utilizing GSM, GPRS, EDGE or the like, a receiver's ability to properly decode a received signal depends upon the receiver's ability to maintain accurate symbol timing. As wireless communications become ever more prevalent, however, increasing amounts of interference can negatively impact a receiver's ability to maintain this timing.

SUMMARY

According to one aspect of the subject technology, a method for suppressing interference in a wireless communication is provided. The method comprises receiving a burst of symbols, generating a plurality of timing hypotheses for the burst of symbols, and calculating, for each timing hypothesis, a plurality of weights for an interference suppression filter based upon a subset of the burst of symbols. The method further comprises, for each timing hypothesis, filtering the subset of the burst of symbols using the interference suppression filter with the corresponding plurality of weights, and selecting one of the plurality of timing hypotheses corresponding to a selection criteria. The method further comprises equalizing and decoding the filtered burst of symbols based upon the selected one of the plurality of timing hypotheses.

According to another aspect of the subject technology, a receiver comprises an antenna configured to receive a burst of symbols, a timing estimator configured to generate a plurality of timing hypotheses for the burst of symbols, and a processor configured to calculate, for each timing hypothesis, a plurality of weights for an interference suppression filter based upon a subset of the burst of symbols. The interference suppression filter is configured, for each timing hypothesis, to filter the subset of the burst of symbols with the corresponding plurality of weights. The processor is configured to select one of the plurality of timing hypotheses corresponding to a selection criteria. The receiver further comprises an equalizer configured to equalize the filtered burst of symbols based upon the selected one of the plurality of timing hypotheses, and a decoder configured to decode the equalized filtered burst of symbols based upon the selected one of the plurality of timing hypotheses.

According to yet another aspect of the subject technology, a receiver comprises means for receiving a burst of symbols, means for generating a plurality of timing hypotheses for the burst of symbols, and means for calculating, for each timing hypothesis, a plurality of weights for interference suppression means based upon a subset of the burst of symbols. The interference suppression means are for filtering, for each timing hypothesis, the subset of the burst of symbols with the corresponding plurality of weights. The receiver further comprises means for selecting one of the plurality of timing hypotheses corresponding to a selection criteria, and means for equalizing and decoding the filtered burst of symbols based upon the selected one of the plurality of timing hypotheses.

According to yet another aspect of the subject technology, a machine-readable medium comprises instructions for suppressing interference in a wireless communication. The instructions comprise code for receiving a burst of symbols, generating a plurality of timing hypotheses for the burst of symbols, and calculating, for each timing hypothesis, a plurality of weights for an interference suppression filter based upon a subset of the burst of symbols. The instructions further comprise code for filtering, for each timing hypothesis, the subset of the burst of symbols using the interference suppression filter with the corresponding plurality of weights, selecting one of the plurality of timing hypotheses corresponding to a selection criteria, and equalizing and decoding the filtered burst of symbols based upon the selected one of the plurality of timing hypotheses.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
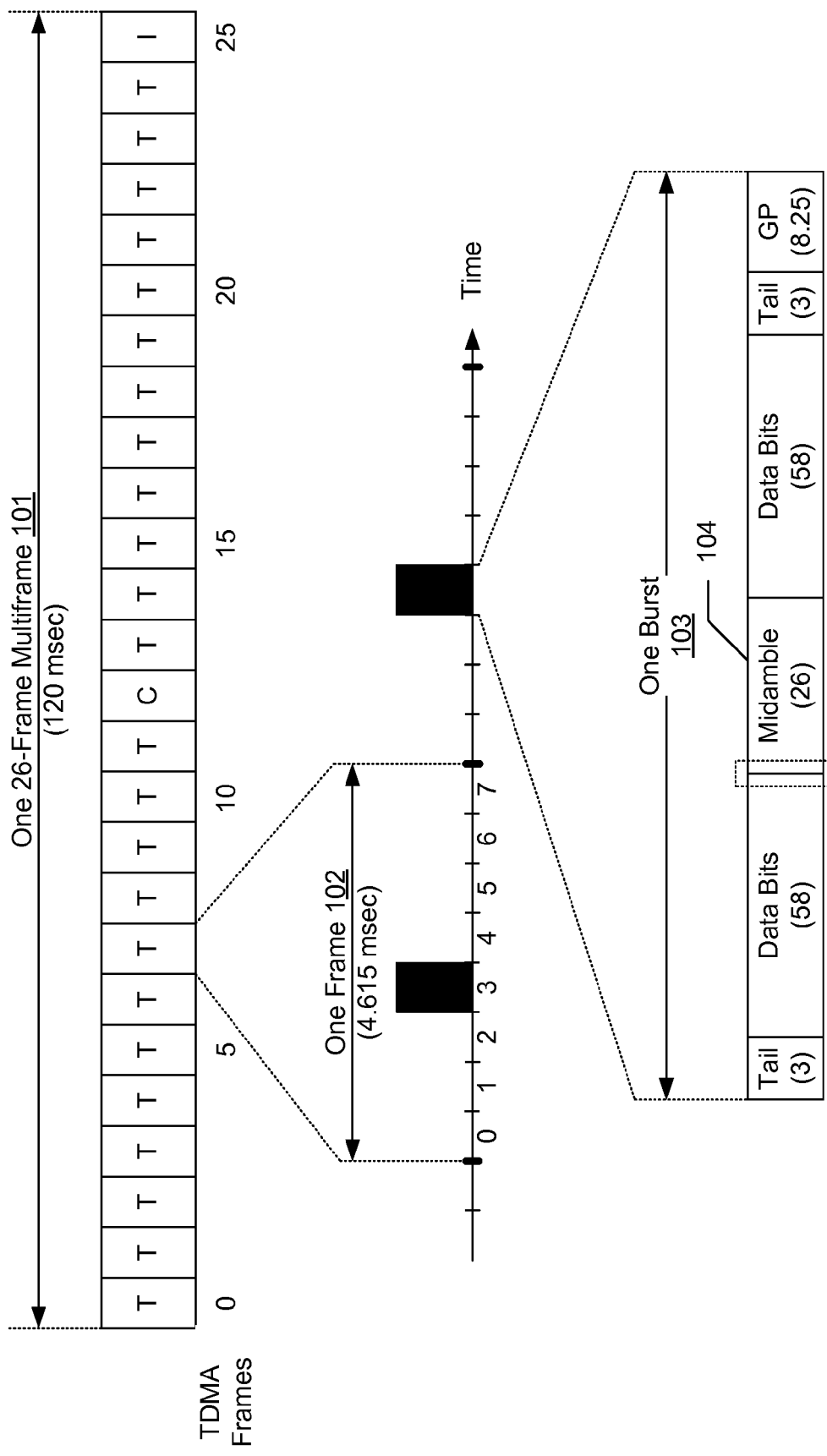
FIG. 1 illustrates exemplary frame and burst formats in GSM in accordance with one aspect of the subject technology.

FIG. 1 shows exemplary frame and burst formats in GSM. The timeline for downlink transmission is divided into multiframes. For traffic channels used to send user-specific data, each multiframe, such as exemplary multiframe 101, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 1. A control channel, identified by the letter "C," is sent in TDMA frame 12. No data is sent in the idle TDMA frame 25 (identified by the letter "I"), which is used by the wireless devices to make measurements for neighbor base stations.

Each TDMA frame, such as exemplary TDMA frame 102, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 103, includes two tail fields, two data fields, a training sequence (or midamble) field, and a guard period (GP). The number of bits in each field is shown inside the parentheses. GSM defines eight different training sequences that may be sent in the training sequence field. Each training sequence, such as midamble 104, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of ±1, ±2, ±3, ±4, and ±5, and (3) a zero or non-zero value for all other time shifts.

One approach to locating a midamble in a burst of symbols serially compares hypotheses regarding the midamble position to determine which hypothesis provides the highest correlation energy between the known midamble sequence and the hypothesized position in the burst of symbols. This method is very sensitive to interference from multi-paths of the same midamble sequence, which can cause the correlation energy of inaccurate hypotheses to be affected by time-delayed copies thereof.

Figure 2:
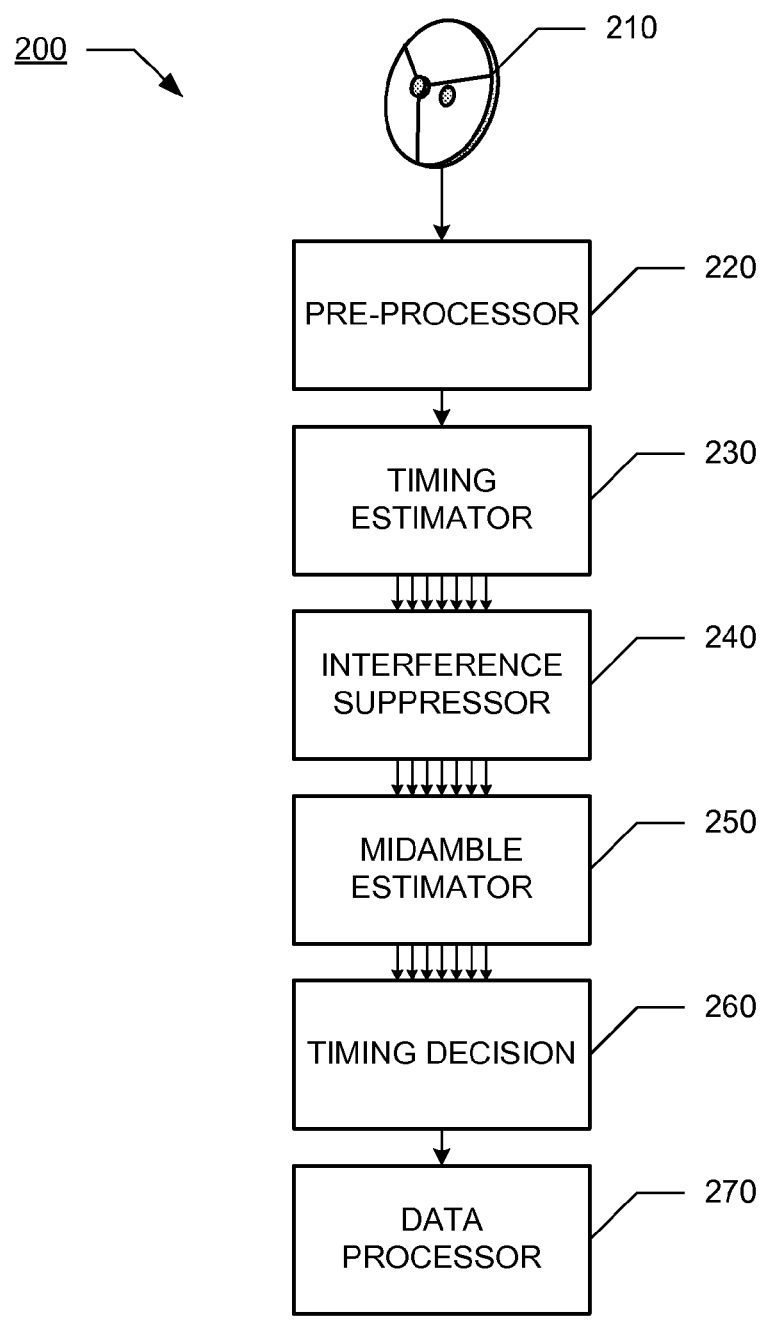
FIG. 2 illustrates a receiver for use in a wireless communication system in accordance with one aspect of the subject technology.

FIG. 2 illustrates a receiver for use in a wireless communication system in accordance with one aspect of the subject technology. Receiver 200 includes an antenna 210 configured to receive a wireless signal. While receiver 200 may be used in various communication systems, for clarity, receiver 200 is specifically described herein with respect to a GSM system. The received signal is provided to a pre-processor 220 which demodulates the signal to generate received samples. Pre-processor 220 may include a GMSK-to-BPSK rotator that performs phase rotation on the received samples. Timing estimator 230 receives the samples from pre-processor 220 and makes several hypotheses regarding where a training sequence of symbols (i.e., midamble) begins in the burst of data. Interference suppressor 240 performs single antenna interference cancellation on the samples for each timing hypothesis, and midamble estimator 250 generates a midamble estimation error for each hypothesis. Timing decision circuit 260 compares the midamble estimation errors for each hypothesis and selects the hypothesis with the lowest midamble estimation error. The selection of a hypothesis by timing decision circuit 260 represents the position in the burst of symbols where the midamble is estimated to begin. The filtered signal is provided to data processor 270, which processes the received symbols based upon the selected timing hypothesis, and outputs the data corresponding to the received symbols.

Rather than utilizing a determined correlation energy to select which hypothesis regarding the midamble timing is accurate, timing estimator 230 performs single antenna interference cancellation ("SAIC") to provide an estimate of the symbols making up the training sequence, which are compared against the previously-known symbols of that training sequence to determine an estimation error therefor.

To begin the search for the first midamble symbol, timing estimator 230 opens a "window" around the estimated beginning of the midamble sequence. The position of the first symbol of the midamble sequence can be estimated for a given burst, based upon the known structure of each burst. For example, as illustrated in FIG. 1, the beginning of midamble 104 in burst 103 begins in the 62nd bit of the burst. Based upon this known structure, timing estimator 230 selects a window 105 of bits representing a series of hypotheses regarding where the first midamble symbol may be located. Exemplary window 105 is illustrated in greater detail in FIG. 3.

Figure 3:
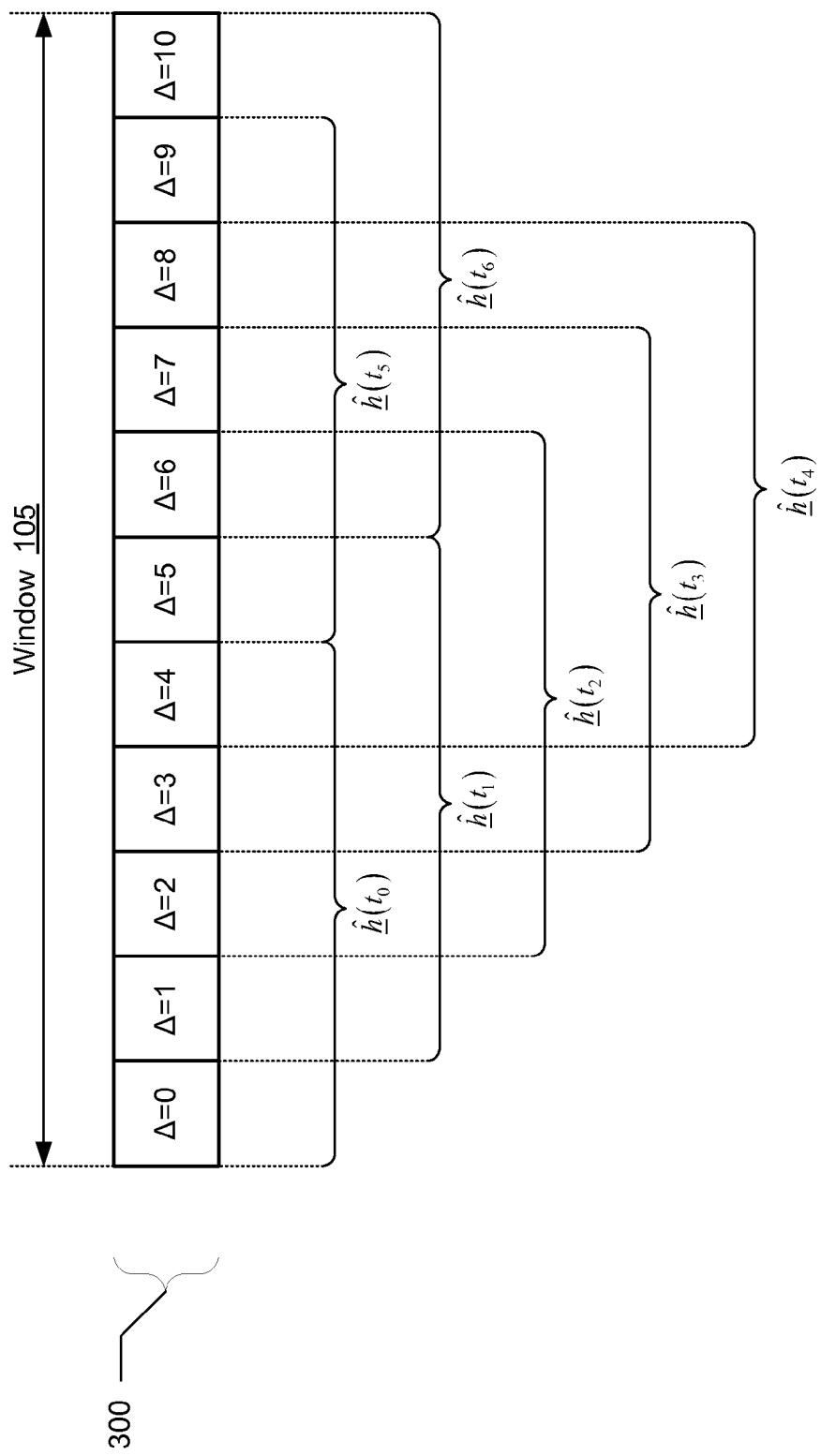
FIG. 3 illustrates a subset of symbols, including the first midamble symbol, that a receiver selects in accordance with one aspect of the subject technology.

As can be seen with reference to FIG. 3, exemplary window 105 comprises 11 symbols, labeled $\Delta=0$ to $\Delta=10$. Each $\Delta$ value represents the position of the symbol in the window. With reference to the position of a symbol in the entire burst, however, the $\Delta$ value is offset by an offset value (e.g., $\Delta=5$ may be offset by 61 to represent the position of this symbol in the entire burst). For the first seven symbols in window 105, timing estimator 230 may generate a channel estimate from a sequence of five contiguous symbols (representing the five-tap channel format of GSM). For example, symbol $\Delta=0$ corresponds to channel estimate $\hat{h}(t_0)$, symbol $\Delta=1$ corresponds to channel estimate $\hat{h}(t_1)$, etc. Each of these channel estimates is then processed by interference suppressor 240 and midamble estimator 250 to determine estimated midamble symbols corresponding thereto, in order to determine a midamble estimation error therefor.

While in the present exemplary aspect, window 105 has been illustrated as consisting of exactly 11 symbols, the scope of the present invention is not limited to such an arrangement. Rather, as will be readily apparent to one of skill in the art, any window size (up to the size of the entire data burst) may be selected. For example, in accordance with one aspect of the subject technology, the size of the search window may be chosen to be twice the size of the expected minimum propagation delay. Alternatively, the search window size may be parameterized based on any other metric known to those of skill in the art.

According to one aspect, a channel estimate $\hat{h}$ is generated by timing estimator 230 by correlating the received samples (corresponding to the hypothesized delay) with the reference samples (i.e., the known midamble sequence) for each hypothesis. Based on the correlation $R_{ys}(\Delta)$ between received signal y and midamble sequence s for a hypothesized delay $\Delta$, the channel estimate may be calculated as follows:

$$h^{(\delta)} = [R_{ys}(\delta), R_{ys}(\delta+1), \ldots, R_{ys}(\delta+4)] \text{ for } \delta = 0, 1, \ldots, 6 \quad (1)$$

$$\delta^* = \underset{\delta}{\operatorname{argmax}}\{\|h_1^{(\delta)}\|^2\} \quad (2)$$

$$\hat{h} = [R_{ys}(\delta^*) R_{ys}(\delta^*+1) \ldots R_{ys}(\delta^*+4)]. \quad (3)$$

To test the hypothesis corresponding to each channel estimate, interference suppressor 240 performs SAIC on each estimated channel. SAIC is a method by which oversampled and/or real/imaginary decomposition of a signal is used to provide virtual antennas with separate sample sequences, such that weights may be applied to the virtual antennas to form a beam in the direction of a desired transmitter and a beam null in the direction of an undesired interference source. In general, SAIC may be achieved with one or multiple actual antennas at the receiver by using space-time processing, where "space" may be virtually achieved with inphase and quadrature components, and "time" may be achieved using late and early samples.

For example, given a set of spatial and temporal samples at a time k:

$$x_k = \begin{bmatrix} x_k(1) \\ x_k(2) \\ \vdots \\ x_k(M) \end{bmatrix}, s_k = \begin{bmatrix} s_k \\ s_{k-1} \\ \vdots \\ s_{k-v} \end{bmatrix}$$

where $s_k$ is the midamble/quasi-midamble signal at time k, $\underline{s}_k$ is a (v+1)×1 midamble/quasi-midamble vector, and $\underline{x}_k$ is a M×1 received midamble/quasi-midamble vector, a set of spatial temporal samples can be defined as $$X_k = \begin{bmatrix} \underline{x}_k \\ \underline{x}_{k-1} \\ \vdots \\ \underline{x}_{k-L} \end{bmatrix},$$

where $X_k$ is a M×(L+1)×1 vector of spatial temporal samples with a spatial length of M and a temporal length of L+1. Accordingly, a spatial/temporal structured matrix can be constructed, such that $$[X]=[X_k X_{k+1} \ldots X_{k+p-v}],$$

where [X] is a M(L+1)×p−v matrix, and p is the length of the midamble or quasi-midamble (data aided).

Accordingly, given [X] and $\tilde{\underline{s}}_k = [\underline{s}_k, \underline{s}_{k+1}, \ldots \underline{s}_{k+p-v}]$, (v+1)×p−v, a suppression filter $W_{SAIC}$ can be computed according to one aspect of the subject disclosure by estimating a reference sequence of symbols at the channel input:

$$W_{SAIC} = \arg\min \|W[X] - \tilde{Z}\|^2 \quad (4)$$

where W=(v+1)×M(L+1) and $\tilde{Z} = \tilde{\underline{s}}_k$, (v+1)×(p−v).

The foregoing equation can be rewritten as $$W_{SAIC} = \tilde{Z}[X]^\dagger, (v+1) \times M(L+1) \quad (5)$$

or, more particularly, as $$W_{SAIC} = \tilde{\underline{s}}_k [X]^T \{[X][X]^T\}^{-1}. \quad (6)$$

The output of interference suppressor 240 is in the form $\hat{S}$, where $\hat{S}$ represents an estimate of the midamble sequence. The difference between the estimated and known midamble sequences is determined according to Equation 7, below:

$$\|S - \hat{S}\|^2 = e_m(t_i) \quad (7)$$

to obtain a midamble estimation error $e_m(t_i)$ for each time $t_i$. Each time $t_i$ is equal to the hypothesized position $\Delta_i$ plus an offset $T_s$ from the beginning of the burst:

$$t_i = \Delta_i + T_s \quad (8)$$

Once the midamble estimation error $e_m(t_i)$ for each time $t_i$ is determined, timing decision block 260 determines which hypothesis corresponds to the lowest estimation error $e_m$, and the other hypothesized timing values are discarded.

According to one aspect of the subject disclosure, data processor 270 comprises a soft output generator that receives the signal from timing decision block 260 and generates soft decisions that indicate the confidence in the detected bits. A soft output generator may implement an Ono algorithm, as is well known to those of skill in the art. Data processor 270 may further comprise a de-interleaver that de-interleaves the soft decisions, and passes the soft decisions to a Viterbi decoder that decodes the deinterleaved soft decisions and outputs decoded data.

According to one aspect of the subject disclosure, the foregoing method for interference suppression enjoys a number of benefits when compared to a method utilizing channel output beamforming. For example, as can be seen with reference to Equation 4, the interference suppression filter weights are calculated by minimizing the cost function $$J = \min(\|W[X] - S\|^2). \quad (9)$$

Accordingly, the suppression filter weights (of Equation 6) have the dimensionality of v×M(L+1), and the filtered output has the dimensionality of v×(p−v). Accordingly, the size of the filter weights grows linearly with the number of antennas (whether real or virtual), and the size of the filtered output sample matrix remains constant even as the number of antennas (or virtual antennas) grows. This offers dramatic improvements in computational simplicity and storage requirements over a channel output setup, in which the interference suppression filter weights are calculated by minimizing the cost function $$J = \min(\|W[X] - HS\|^2), \quad (10)$$

which results in suppression filter weights with a dimensionality of M×M(L+1) and a filtered output with a dimensionality of M×(p−v) (i.e., where the number of filter weights scale geometrically with the number of antennas, and where the size of the filtered output sample matrix increases linearly with the number of antennas). Such a channel output setup further involves greater storage and backend ISI equalization using non-linear equalizers (such as an MLSE, where the number of input streams must be set equal to M. In the channel input setup, the number of input streams for the backend ISI equalization is only v, and the number of back-substitutions in the computation of the filter weights is reduced (not being proportional to the number of antennas, as in the channel output setup). Despite the computational simplicity, however, the performance of the system is at least as good as, if not better than, the channel output setup. In this regard, the channel input setup provides good robustness against channel estimation error, which tends to dominate the performance of a GERAN receiver when interference is present.

Figure 4:
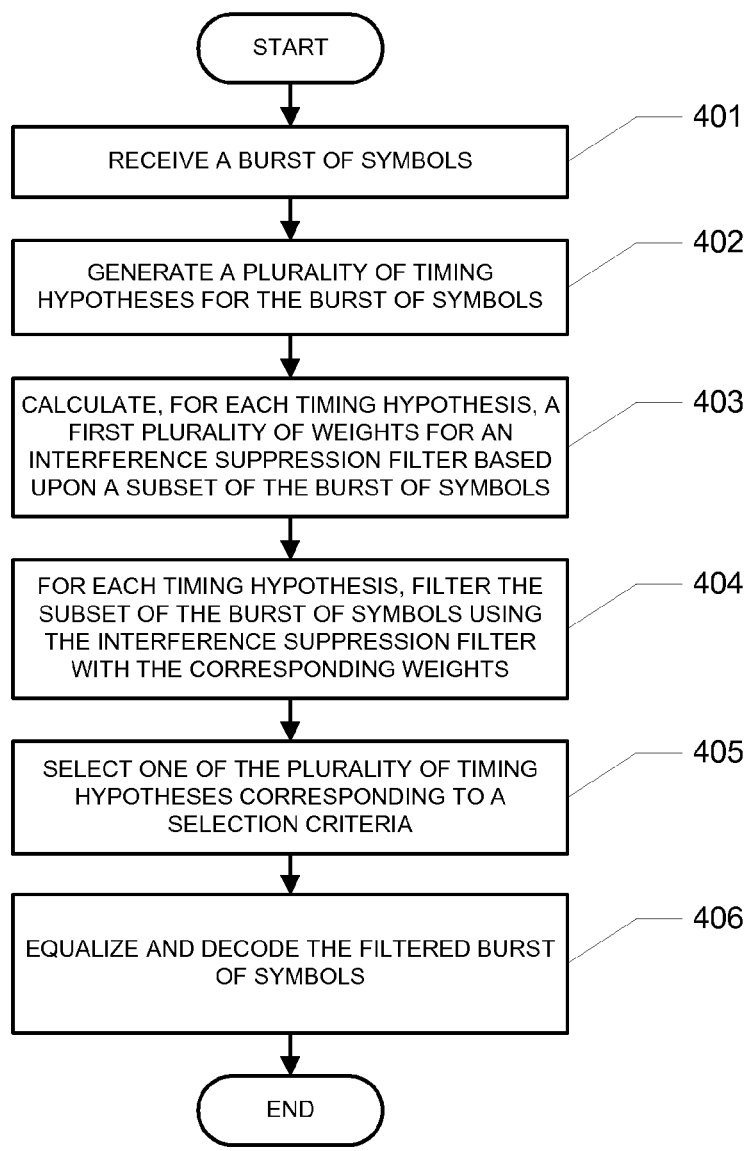
FIG. 4 illustrates a method for suppressing interference in accordance with one aspect of the subject technology.

FIG. 4 is a flow chart illustrating a method for interference suppression in accordance with one aspect of the subject technology. The method begins with step 401, in which a burst of symbols are received. In step 402, a plurality of timing hypotheses are generated for the burst of symbols. In step 403, the receiver calculates, for each timing hypothesis, a plurality of weights for an interference suppression filter based upon a subset of the burst of symbols. For each timing hypothesis, the subset of the burst of symbols is filtered by the interference suppression filter with the corresponding plurality of weights in step 404. In step 405, one of the plurality of timing hypotheses corresponding to a selection criteria is selected. The selection criteria may be, for example, a midamble estimation error. In step 406, the filtered burst of symbols is equalized and decoded.

Figure 5:
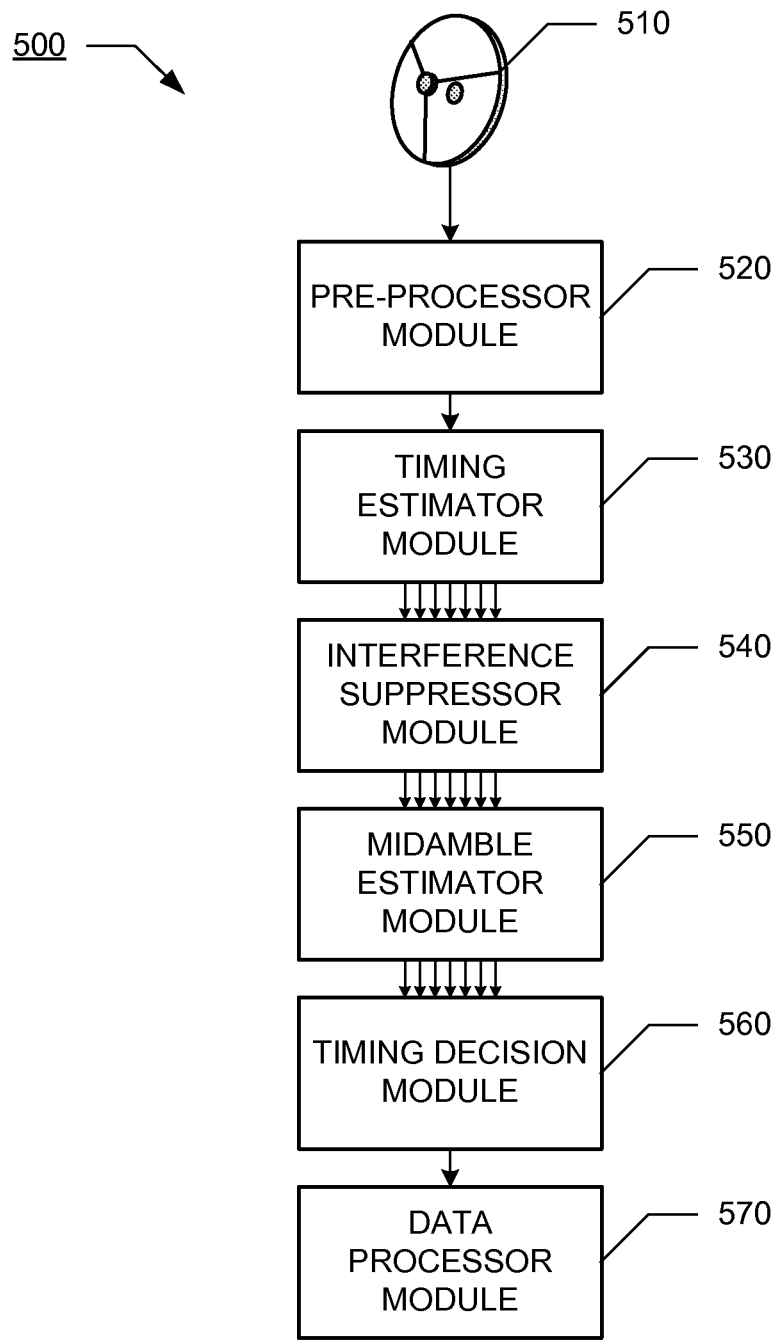
FIG. 5 illustrates a receiver for use in a wireless communication system in accordance with one aspect of the subject technology.

FIG. 5 illustrates a receiver for use in a wireless communication system in accordance with one aspect of the subject technology. Receiver 500 includes an antenna module 510 configured to receive a wireless signal such as, for example, an RF modulated GSM signal. The received signal is provided to a pre-processor module 520 which demodulates the signal to generate received samples. Pre-processor module 520 may also include a GMSK-to-BPSK rotator that performs phase rotation on the received samples. Timing estimation module 530 receives the samples from pre-processing module 520 and makes several hypotheses regarding where a training sequence of symbols (midamble) begins in the burst of data, to provide several hypothetical channel estimates. Interference suppression module 540 performs single antenna interference cancellation by calculating a plurality of filter weights for each hypothesis and then applying the filter, with the calculated weights, to each channel estimate hypothesis. Midamble estimation module 550 generates a midamble estimation error for each hypothesis, and timing decision module 560 compares the midamble estimation errors for each hypothesis and selects the hypothesis with the lowest midamble estimation error. The selection of a hypothesis by timing decision module 560 represents the position in the burst of symbols where the midamble is estimated to begin. The filtered signal is then provided to data processor module 570, which processes the received symbols based upon the selected timing hypothesis, and outputs the data corresponding to the received symbols.

Figure 6:
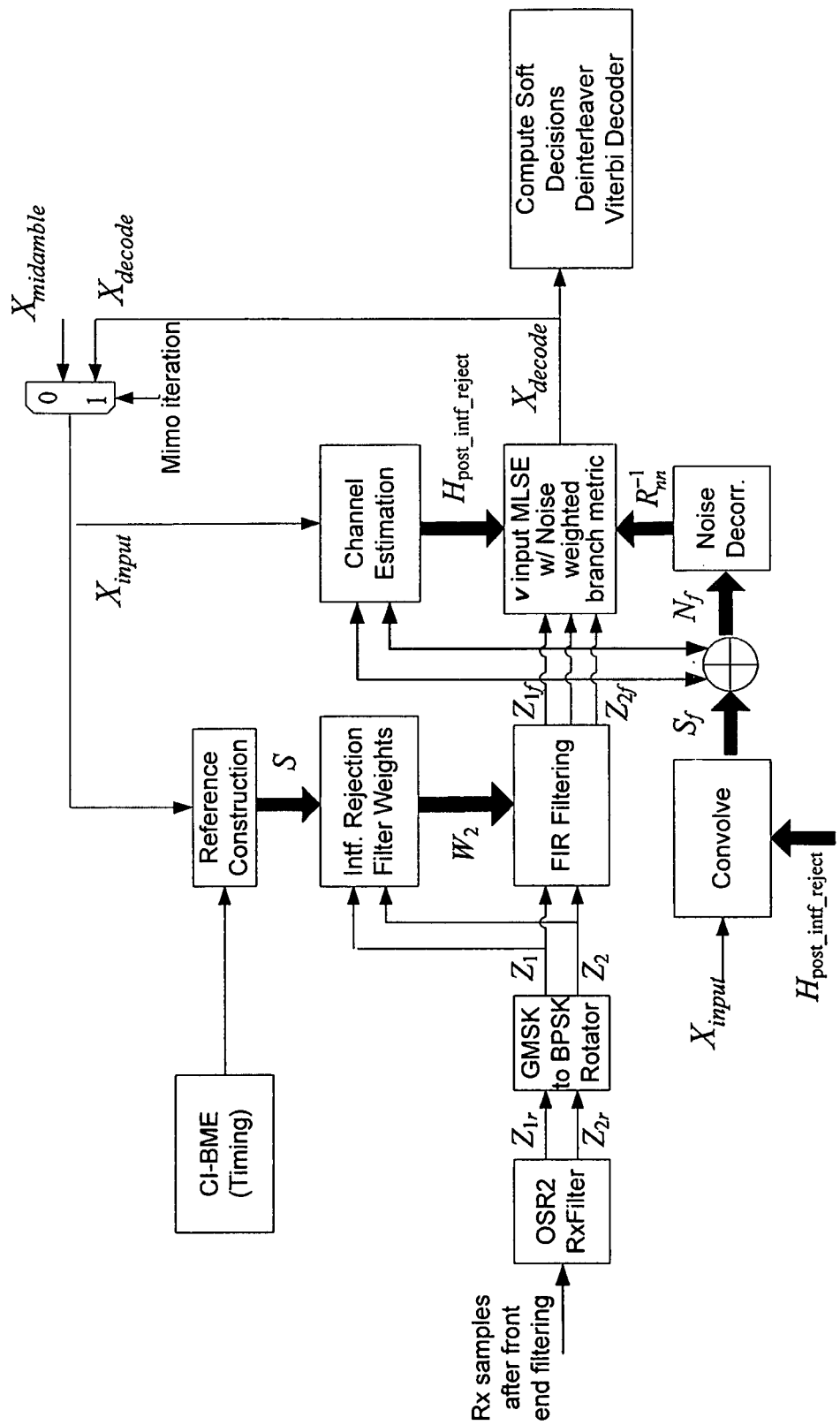
FIG. 6 is a block diagram illustrating a receiver for use in a wireless communication system in accordance with one aspect of the subject technology.

FIG. 6 is a block diagram illustrating a receiver for use in a wireless communication system in accordance with one aspect of the subject technology. As can be seen with reference to FIG. 6, received samples are provided to an OSR2 Rx filter after front end filtering. From there, the samples pass through a GMSK to BPSK rotator, as described in greater detail above. An optimum burst timing is obtained using a reference signal, without performing channel estimation. Using the reference signal, the filter coefficients are calculated for the interference suppression filter (i.e., in a channel input configuration), and the received samples are filtered with the interference suppression filter. Channel estimation may be performed using the reference signal and the filtered samples, and noise correlation may subsequently be computed using the filtered samples, the reference signal and the estimated channels. The received samples may then be decorrelated across a spatial dimension, and the decorrelated samples equalized using non-linear equalizer. Hard decisions from the equalizer may be provided to a soft decision computing block, which provides soft decisions to a decoder, such as a Viterbi decoder. According to one aspect, the hard decisions outputted by the equalizer can be fed back as a reference signal to obtain optimum burst timing for the next burst of symbols, and the flow repeated. As can be seen with reference to FIG. 6, the optimum burst timing can be obtained without performing channel estimation. Accordingly, all of the symbol streams (e.g., 5 streams when the channel delay spread $\mu=5$), are provided all the way to the equalizer.

While in the foregoing exemplary embodiments, the interference suppression filter has been described as a single antenna interference cancellation filter, the scope of the present invention is not limited to such an embodiment. Rather, as will be apparent to those of skill in the art, the subject technology has application to systems with more than one antenna, which may perform, for example, dual antenna interference cancellation ("DAIC"), or any other multiple-antenna interference cancellation method, well known to those in the art.

Figure 7:
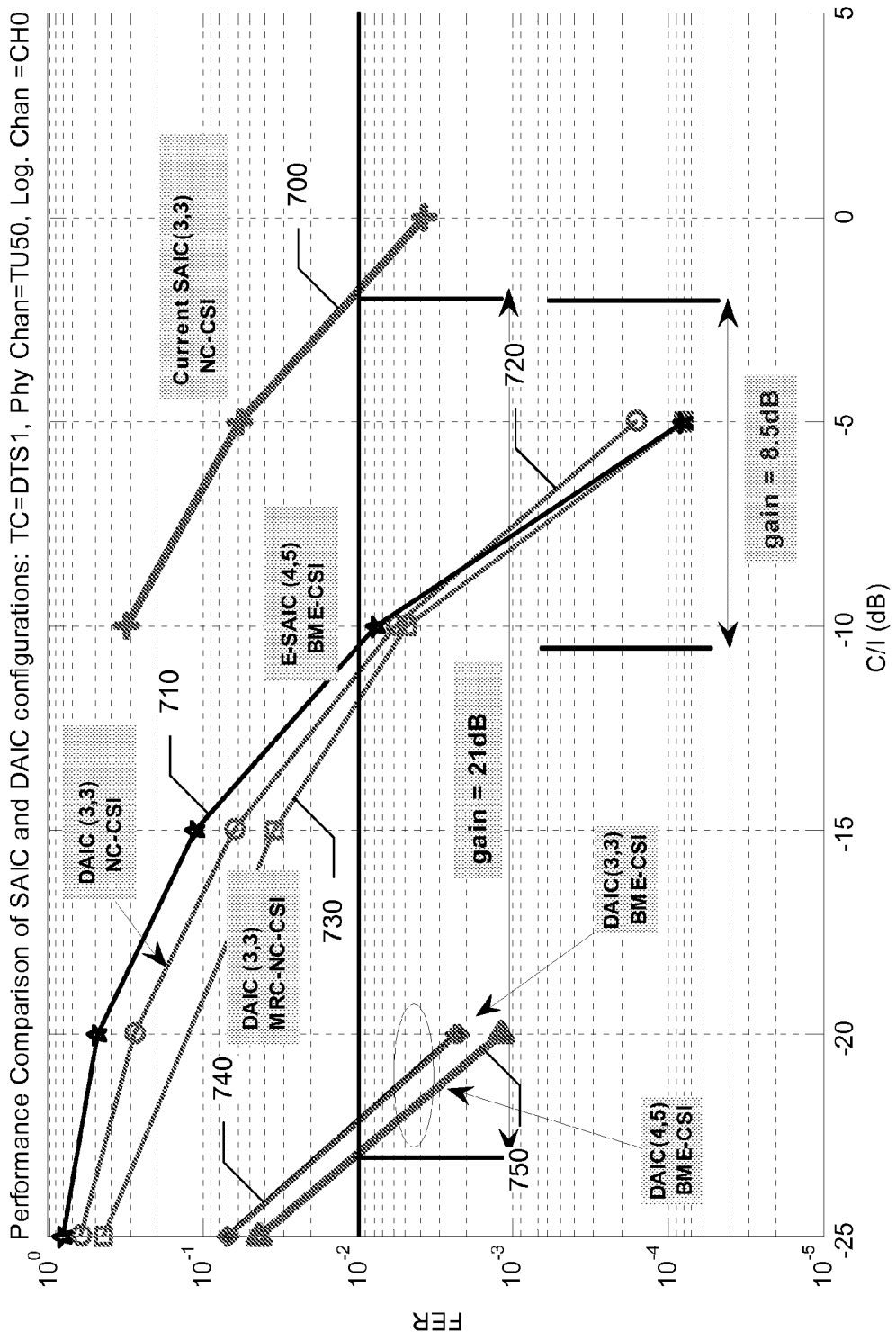
FIG. 7 is a chart illustrating performance improvements achievable utilizing various aspects of the subject technology.

FIG. 7 is a chart illustrating performance improvements achievable utilizing various aspects of the subject technology. FIG. 7 charts the frame error rate over a range of carrier to interference ("C/I") levels for exemplary receiver systems utilizing the interference suppression techniques described in greater detail above. As can be seen with reference to FIG. 7, the performance of a SAIC receiver system 700 that does not re-calculate the filter weights using the entire burst is less than optimal. When compared with system 700, it can be seen that a SAIC receiver system 710 utilizing an interference suppression method according to one aspect of the subject technology enjoys a gain of about 8.5 dB. Similarly, a great improvement in performance is enjoyed by exemplary DAIC receiver systems 740 and 750 over DAIC receiver systems 720 and 730 which utilize an interference suppression method according to one aspect of the subject technology.

Figure 8:
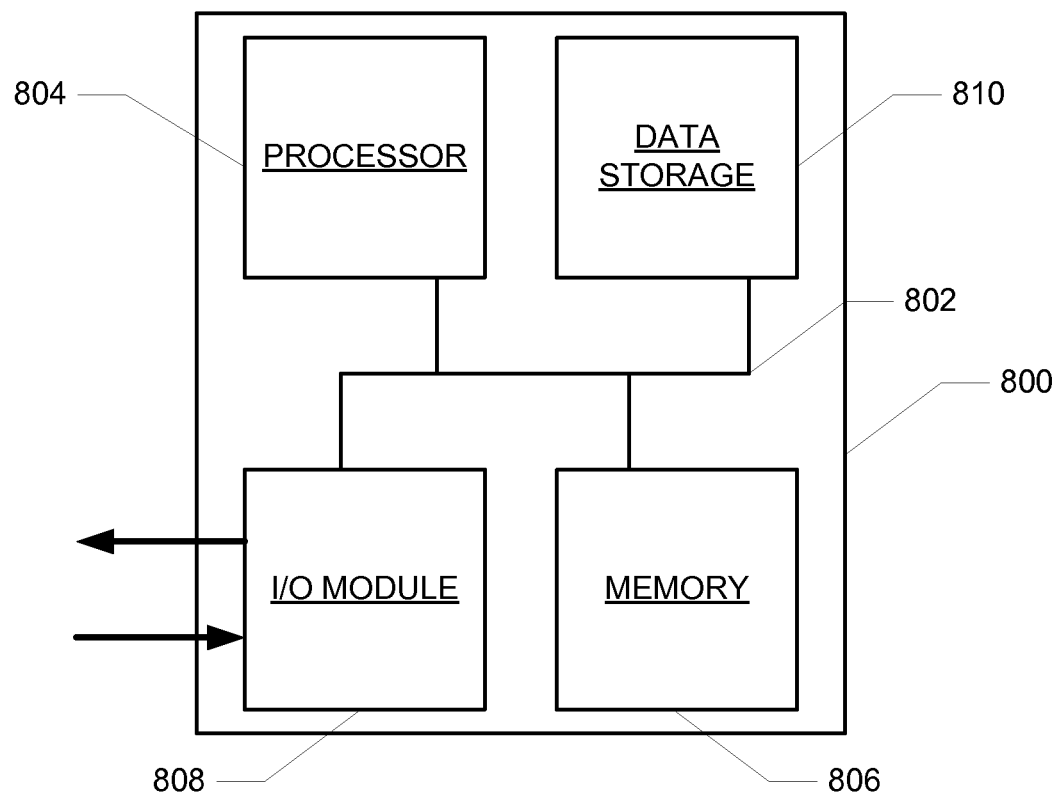
FIG. 8 is a block diagram illustrating a computer system with which certain aspects of the subject technology may be implemented.

FIG. 8 is a block diagram that illustrates a computer system 800 upon which an aspect may be implemented. Computer system 800 includes a bus 802 or other communication mechanism for communicating information, and a processor 804 coupled with bus 802 for processing information. Computer system 800 also includes a memory 806, such as a random access memory ("RAM") or other dynamic storage device, coupled to bus 802 for storing information and instructions to be executed by processor 804. Memory 806 may also be used for storing temporary variable or other intermediate information during execution of instructions to be executed by processor 804. Computer system 800 further includes a data storage device 810, such as a magnetic disk or optical disk, coupled to bus 802 for storing information and instructions.

Computer system 800 may be coupled via I/O module 808 to a display device (not illustrated), such as a cathode ray tube ("CRT") or liquid crystal display ("LCD") for displaying information to a computer user. An input device, such as, for example, a keyboard or a mouse may also be coupled to computer system 800 via I/O module 808 for communicating information and command selections to processor 804.

According to one aspect, interference suppression is performed by a computer system 800 in response to processor 804 executing one or more sequences of one or more instructions contained in memory 806. Such instructions may be read into memory 806 from another machine-readable medium, such as data storage device 810. Execution of the sequences of instructions contained in main memory 806 causes processor 804 to perform the process steps described herein. One or more processors in a multi-processing arrangement may also be employed to execute the sequences of instructions contained in memory 806. In alternative aspects, hard-wired circuitry may be used in place of or in combination with software instructions to implement various aspects. Thus, aspects are not limited to any specific combination of hardware circuitry and software.

The term "machine-readable medium" as used herein refers to any medium that participates in providing instructions to processor 804 for execution. Such a medium may take many forms, including, but not limited to, non-volatile media, volatile media, and transmission media. Non-volatile media include, for example, optical or magnetic disks, such as data storage device 810. Volatile media include dynamic memory, such as memory 806. Transmission media include coaxial cables, copper wire, and fiber optics, including the wires that comprise bus 802. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for suppressing interference in a wireless communication, comprising the steps of:
    receiving a burst of symbols;
    generating a plurality of timing hypotheses for the burst of symbols using a set of known reference symbols and a first subset of the burst of symbols in a channel input configuration, wherein generating the plurality of timing hypotheses comprises estimating a position of a reference symbol in the burst of symbols and selecting the first subset of a first burst of symbols from symbols centered around the estimated position;
    for each timing hypothesis, determining a cost of the timing hypothesis by applying a cost function to an estimated set of reference symbols, wherein the cost function comprises comparing the estimated set of reference symbols with the known set of reference symbols to determine an estimation error;
    calculating, using one or more processors, a plurality of weights for an interference suppression filter based upon a minimum cost associated with the plurality of timing hypotheses;
    filtering the first subset of the burst of symbols using the interference suppression filter with the corresponding plurality of weights to produce a set of symbol streams;
    selecting one of the plurality of timing hypotheses corresponding to a selection criteria based on the determined estimation error;
    equalizing and decoding a full set of symbol streams without a channel estimation input based upon the selected one of the plurality of timing hypotheses; and
    feeding back the output of the equalizing as a reference via a multiple input multiple output (MIMO) iteration to obtain optimum burst timing for a second subset of the burst of symbols.

2. The method of claim 1, wherein the selection criteria is a midamble estimation error.

3. The method of claim 2, wherein the midamble estimation error is calculated for each timing hypothesis by:
    determining an estimated channel corresponding to the timing hypothesis;
    performing single antenna interference cancellation on the estimated channel to obtain an estimated midamble sequence; and
    comparing the estimated midamble sequence with a previously-known midamble sequence to determine the midamble estimation error.

4. The method of claim 3, wherein the determining the estimated channel corresponding to the timing hypothesis comprises selecting a predetermined number of adjacent symbols in the first subset corresponding to a number of taps in the estimated channel.

5. The method of claim 1, wherein the generating the plurality of timing hypotheses comprises estimating a position of a first midamble symbol in the burst of symbols and selecting the first subset of the burst of symbols from symbols centered around the estimated position.

6. The method of claim 1, wherein the plurality of weights for each timing hypothesis are calculated by solving for $$W_{SAIC} = \hat{\underline{s}}[X]^T \{[X][X]^T\}^{-1},$$

where $\hat{\underline{s}}_k$ is a vector corresponding to an estimate of the subset of symbols, $[X]$ is a matrix of spatial temporal samples of the burst of symbols, and $[X]^T$ is a transpose of $[X]$.

7. The method of claim 1, wherein the interference suppression filter is a single antenna interference cancellation (SAIC) filter.

8. The method of claim 1, wherein the interference suppression filter is a dual antenna interference cancellation (DAIC) filter.

9. The method of claim 1, wherein the second subset comprises at least one of the burst of symbols or an additional burst of symbols.

10. A receiver comprising:
    an antenna configured to receive a burst of symbols;
    a timing estimator configured to generate a plurality of timing hypotheses for the burst of symbols using a set of known reference symbols and a first subset of the burst of symbols in a channel input configuration, wherein generating the plurality of timing hypotheses comprises estimating a position of a reference symbol in the burst of symbols and selecting the first subset of a first burst of symbols from symbols centered around the estimated position;
a processor configured to:
determine, for each timing hypothesis, a cost of the timing hypothesis by applying a cost function to an estimated set of reference symbols, wherein the cost function comprises comparing the estimated set of reference symbols with the known set of reference symbols to determine an estimation error; and
calculate a plurality of weights for an interference suppression filter based upon a minimum cost associated with the plurality of timing hypotheses;
the interference suppression filter configured to filter the first subset of the burst of symbols with the corresponding plurality of weights to produce a set of symbol streams;
the processor configured to select one of the plurality of timing hypotheses corresponding to a selection criteria based on the determined estimation error;
an equalizer configured to equalize a full set of symbol streams without a channel estimation input based upon the selected one of the plurality of timing hypotheses; and
a decoder configured to:
decode the equalized full set of symbol streams based upon the selected one of the plurality of timing hypotheses; and
feed the output of the equalizing back as a reference via a multiple input multiple output (MIMO) iteration to obtain optimum burst timing for a second subset of the burst of symbols.

11. The receiver of claim 10, wherein the selection criteria is a midamble estimation error.

12. The receiver of claim 11, wherein the midamble estimation error is calculated for each timing hypothesis by:
determining an estimated channel corresponding to the timing hypothesis;
performing single antenna interference cancellation on the estimated channel to obtain an estimated midamble sequence; and
comparing the estimated midamble sequence with a previously-known midamble sequence to determine the midamble estimation error.

13. The receiver of claim 12, wherein the determining the estimated channel corresponding to each symbol the timing hypothesis comprises selecting a predetermined number of adjacent symbols in the first subset corresponding to a number of taps in the estimated channel.

14. The receiver of claim 10, wherein the timing estimator is configured to generate the plurality of timing hypotheses by estimating a position of a first midamble symbol in the burst of symbols and selecting the first subset of the burst of symbols from symbols centered around the estimated position.

15. The receiver of claim 10, wherein the processor is configured to calculate the plurality of weights for each timing hypothesis by solving for $$W_{SAIC}=\tilde{s}[X]^T\{[X][X]^T\}^{-1},$$

where $\tilde{s}_k$ is a vector corresponding to an estimate of the subset of symbols, $[X]$ is a matrix of spatial temporal samples of the burst of symbols, and $[X]^T$ is a transpose of $[X]$.

16. The receiver of claim 10, wherein the interference suppression filter is a single antenna interference cancellation (SAIC) filter.

17. The receiver of claim 10, wherein the interference suppression filter is a dual antenna interference cancellation (DAIC) filter.

18. The receiver of claim 10, wherein the second subset comprises at least one of the burst of symbols or an additional burst of symbols.

19. A receiver comprising:
means for receiving a burst of symbols;
means for generating a plurality of timing hypotheses for the burst of symbols using a set of known reference symbols and a first subset of the burst of symbols in a channel input configuration, wherein generating the plurality of timing hypotheses comprises estimating a position of a reference symbol in the burst of symbols and selecting the first subset of a first burst of symbols from symbols centered around the estimated position;
means for determining, for each timing hypothesis, a cost of the timing hypothesis by applying a cost function to an estimated set of reference symbols, wherein the cost function comprises comparing the estimated set of reference symbols with the known set of reference symbols to determine an estimation error;
means for calculating a plurality of weights for interference suppression means based upon a minimum cost associated with the plurality of timing hypotheses;
the interference suppression means for filtering the first subset of the burst of symbols with the corresponding plurality of weights to produce a set of symbol streams;
means for selecting one of the plurality of timing hypotheses corresponding to a selection criteria based on the determined estimation error;
means for equalizing and decoding a full set of symbol streams without a channel estimation input based upon the selected one of the plurality of timing hypotheses; and
means for feeding back the output of the equalizing as a reference via a multiple input multiple output (MIMO) iteration to obtain optimum burst timing for a second subset of the burst of symbols.

20. The receiver of claim 19, wherein the selection criteria is a midamble estimation error.

21. The receiver of claim 20, wherein the midamble estimation error is calculated for each timing hypothesis by:
determining an estimated channel corresponding to the timing hypothesis;
performing single antenna interference cancellation on the estimated channel to obtain an estimated midamble sequence; and
comparing the estimated midamble sequence with a previously-known midamble sequence to determine the midamble estimation error.

22. The receiver of claim 21, wherein the determining the estimated channel corresponding to the timing hypothesis comprises selecting a predetermined number of adjacent symbols in the first subset corresponding to a number of taps in the estimated channel.

23. The receiver of claim 19, wherein the means for generating the plurality of timing hypotheses comprises means for estimating a position of a first midamble symbol in the burst of symbols and means for selecting the first subset of the burst of symbols from symbols centered around the estimated position.

24. The receiver of claim 19, wherein the means for calculating the plurality of weights for each timing hypothesis comprises means for solving for $$W_{SAIC}=\tilde{s}[X]^T\{[X][X]^T\}^{-1},$$

where $\tilde{s}_k$ is a vector corresponding to an estimate of the subset of symbols, [X] is a matrix of spatial temporal samples of the burst of symbols, and $[X]^T$ is a transpose of [X].

25. The receiver of claim 19, wherein the interference suppression means comprises a single antenna interference cancellation (SAIC) filter.

26. The receiver of claim 19, wherein the interference suppression means comprises a dual antenna interference cancellation (DAIC) filter.

27. The receiver of claim 19, wherein the second subset comprises at least one of the burst of symbols or an additional burst of symbols.

28. A non-transitory machine-readable medium comprising instructions for suppressing interference in a wireless communication, the instructions comprising code for:
   receiving a burst of symbols;
   generating a plurality of timing hypotheses for the burst of symbols using a set of known reference symbols and a first subset of the burst of symbols in a channel input configuration, wherein generating the plurality of timing hypotheses comprises estimating a position of a reference symbol in the burst of symbols and selecting the first subset of a first burst of symbols from symbols centered around the estimated position;
   for each timing hypothesis, determining a cost of the timing hypothesis by applying a cost function to an estimated set of reference symbols, wherein the cost function comprises comparing the estimated set of reference symbols with the known set of reference symbols to determine an estimation error;
   calculating a plurality of weights for an interference suppression filter based upon a minimum cost associated with the plurality of timing hypotheses;
   filtering the first subset of the burst of symbols using the interference suppression filter with the corresponding plurality of weights to produce a set of symbol streams;
   selecting one of the plurality of timing hypotheses corresponding to a selection criteria based on the determined estimation error;
   equalizing and decoding a full set of symbol streams without a channel estimation input based upon the selected one of the plurality of timing hypotheses; and
   feeding back the output of the equalizing as a reference via a multiple input multiple output (MIMO) iteration to obtain optimum burst timing for a second subset of the burst of symbols.

29. The non-transitory machine-readable medium of claim 28, wherein the selection criteria is a midamble estimation error.

30. The non-transitory machine-readable medium of claim 29, wherein the midamble estimation error is calculated for each timing hypothesis by:
   determining an estimated channel corresponding to the timing hypothesis;
   performing single antenna interference cancellation on the estimated channel to obtain an estimated midamble sequence; and
   comparing the estimated midamble sequence with a previously-known midamble sequence to determine the midamble estimation error.

31. The non-transitory machine-readable medium of claim 30, wherein the determining the estimated channel corresponding to the timing hypothesis comprises selecting a predetermined number of adjacent symbols in the first subset corresponding to a number of taps in the estimated channel.

32. The non-transitory machine-readable medium of claim 28, wherein the code for generating the plurality of timing hypotheses comprises code for estimating a position of a first midamble symbol in the burst of symbols and code for selecting the first subset of the burst of symbols from symbols centered around the estimated position.

33. The non-transitory machine-readable medium of claim 28, wherein the plurality of weights for each timing hypothesis are calculated by solving for $$W_{SAIC} = \tilde{s}_k [X]^T \{[X][X]^T\}^{-1},$$

where $\tilde{s}_k$ is a vector corresponding to an estimate of the subset of symbols, [X] is a matrix of spatial temporal samples of the burst of symbols, and $[X]^T$ is a transpose of [X].

34. The non-transitory machine-readable medium of claim 28, wherein the interference suppression filter is a single antenna interference cancellation (SAIC) filter.

35. The non-transitory machine-readable medium of claim 28, wherein the interference suppression filter is a dual antenna interference cancellation (DAIC) filter.

36. The non-transitory machine-readable medium of claim 28, wherein the second subset comprises at least one of the burst of symbols or an additional burst of symbols.

* * * * *